United States Patent [19]

Warmann

[11] 4,149,684
[45] * Apr. 17, 1979

[54] PNEUMATIC TUBE CONVEYOR DISPATCHER

[76] Inventor: Bruno D. Warmann, 15362 Fairlane Dr., Livonia, Mich. 48154

[*] Notice: The portion of the term of this patent subsequent to Apr. 18, 1995, has been disclaimed.

[21] Appl. No.: 844,590

[22] Filed: Oct. 25, 1977

Related U.S. Application Data

[63] Continuation-in-part of Ser. No. 775,257, Mar. 7, 1977, Pat. No. 4,084,770.

[51] Int. Cl.² ............................................. B65G 51/28
[52] U.S. Cl. .................................... 243/25; 243/28
[58] Field of Search ................ 243/4, 5, 19, 25, 26, 243/27, 28

[56] References Cited

U.S. PATENT DOCUMENTS

| | | | |
|---|---|---|---|
| 705,884 | 7/1902 | Taisey | 243/28 |
| 881,980 | 3/1908 | Waterhouse | 243/27 |
| 904,414 | 11/1908 | Earl | 243/4 |
| 1,290,758 | 1/1919 | Kraft | 243/28 |

FOREIGN PATENT DOCUMENTS 387902 10/1973 U.S.S.R. ........................................ 243/19

OTHER PUBLICATIONS

Quantum Industries Brochure.

*Primary Examiner*—Robert B. Reeves
*Assistant Examiner*—Jeffrey V. Nase
*Attorney, Agent, or Firm*—Basile and Weintraub

[57] ABSTRACT

A pneumatic tube conveyor dispatcher for converting a pneumatic tube free dispatch system into a pneumatic tube controlled dispatch system. The dispatcher comprises a housing having a rear portion which matingly engages an existing terminal of the free dispatch system such that a carrier storage chamber within the dispatcher housing communicates with the inlet opening of the delivery tube of the free dispatch system. The dispatcher housing includes a door permitting access to the carrier chamber to enable an operator to position a carrier therein. Sensing means associated with the housing chamber senses the presence of the carrier and, in response to a predetermined signal, is operative to actuate a drive mechanism which moves a slider plate from across the terminal inlet opening to communicate the carrier with the pneumatic tube whereby the differential pressure across the carrier results in a force which acts on the carrier to transfer the carrier into the tube.

5 Claims, 5 Drawing Figures

PNEUMATIC TUBE CONVEYOR DISPATCHER

CROSS REFERENCE TO RELATED APPLICATIONS

The present patent application is a continuation-in-part patent application of co-pending patent application Ser. No. 775,257 filed Mar. 7, 1977, and now U.S. Pat. No. 4,084,770, for Pneumatic Tube Conveyor Dispatcher and the same is incorporated herein by reference.

BACKGROUND OF THE INVENTION

I. Field of the Invention

The present invention relates to pneumatic tube conveyor systems and, in particular, to a unique means for converting a free dispatch pneumatic tube conveyor system into a controlled dispatch system.

II. Description of the Prior Art

In the most elementary tube conveyor systems a carrier is conveyed pneumatically directly from a dispatch terminal to a discharge terminal through one conveyor tube and is returned through another, the two tubes comprising a continuous air circuit. Since such a system is cumbersome and generally wasteful of material, conveyor systems have evolved from the simple point-to-point conveying system to the fully automated, computer-controlled systems that are commercially available today. With the advent of the ring dial carriers and the magnetic dial carriers, a greater potential of automation has also been realized. The simple point-to-point tube lines have been replaced by pairs of tube lines, each pair having the capacity to serve up to ten stations. The routing and switching of the carriers is accomplished electronically by reading the designation address selected on the body of the carrier. All sending inlets of the system are tied to one common tube line, while the receiving outlets are tied to another tube line. The two tube lines constitute the pair previously mentioned. To dispatch a carrier, it is necessary for an operator to open the sending inlet door and insert the carrier directly into the tube line. This method, while extremely simple, has serious disadvantages insofar that the operators have a tendency to insert several carriers, one after the other, into the tube line and, thus, overload the same. It is also known that the operators would insert carriers backwards into the system which made it impossible for proper routing, as such proper routing cannot be accomplished when the carrier is inserted in a rearward manner. Such rearward insertion of the carrier into the tube can also damage the carrier and the system. It is also known that operators have inserted foreign materials, such as paper, pencils, bottles and the like, into the system, all of which contribute to malfunctions and shutdowns in the system.

In certain situations operators are required to hold the sending inlet door open for a certain time after inserting the carrier. This can be a very difficult requirement to meet, as many operators will normally insert the carrier within the tube and immediately close the door. If a sufficient amount of time does not pass after the door has been held open, the carrier will stall in the tube line and will have to be retrieved. If, on the other hand, the door is held open for too long a period, the sending tube line can become disabled. Many of these problems have been recognized by pneumatic tube manufacturers; and to compensate, the manufacturers have introduced the so-called "Controlled Inlet Type" of system, which is commonly referred to as "Controlled Dispatch." In the controlled dispatch system the operator does not have direct access to the sending tube line, but instead there is a motorized valve called a slide gate which functions as a barrier to prevent the carrier from being directly inserted within the tube lines. Carriers cannot be dispatched backwards, nor can foreign material be inserted into the system. The carriers that are properly posiioned in the controlled dispatch mechanisms are dispatched in an orderly sequence as determined by a control center. Unfortunately, solutions to the prior art problems and the improvements brought by the controlled dispatch system benefit only users who have bought such systems during the initial construction of the building that utilizes the controlled dispatch conveyor system. To convert the free dispatch system to a controlled dispatch system requires extensive and costly rework of the existing equipment and facilities. Old stations must be replaced with new stations, while tube lines must be rerouted, necessitating the removal of walls, ceilings and the like and their reconstruction. Since the controlled dispatch station is considerably longer than the free dispatch station, there are numerous problems with masonry that may not always be solved to the owner's satisfaction. It would therefore be desirable to provide a simple and inexpensive means for converting a free dispatch system to a controlled dispatch system. The relevant prior art patents known to applicant are U.S. Pat. Nos. 3,767,138; 3,998,405; 3,237,883; and 3,404,921; and Great Britain Pat. No. 1,333,596. These patents were cited in the aforementioned United States patent application Ser. No. 775,257.

III. Prior Art Statement

In the opinion of applicant and applicant's attorney, the aforementioned patents represent the closest prior art of which applicant and applicant's attorney are aware.

SUMMARY OF THE INVENTION

The present invention, which will be described subsequently in greater detail, comprises a dispatcher for converting a free dispatch pneumatic tube conveyor system into a controlled dispatch pneumatic tube conveyor system. The dispatcher comprises a housing mounted to the inlet opening of each sending station in the system. The housing includes a carrier chamber in which an operator positions a carrier desired to be injected into the pneumatic system. The housing includes drive means operable upon actuation for moving a slider plate to a position which opens communication with the inlet to the pneumatic tube, whereupon the carrier is delivered into the pneumatic tube. As a vacuum builds up inside the chamber holding the carrier, atmospheric pressure exerts a force at the base of the carrier to propel the carrier up and inject the same into the tube system.

It is therefore a primary object of the present invention to provide a means whereby a free dispatch pneumatic tube conveyor system may be converted into a controlled dispatch system without the need for extensive modification to the existing facility, the same being accomplished in a simple and economic fashion which is substantially less expensive than converting a free dispatch system into a controlled dispatch system of conventional design.

It is a further object of the present invention to provide a means for converting a free dispatch system into a controlled dispatch system which may be done on a step-by-step basis, thus, minimizing the need for capital investment at any given point whereby a portion of the system may be of a controlled, dispatched nature, while other portions of the system may be of the free dispatch nature.

It is a further object of the present invention to provide a means for converting a free dispatch system into a controlled dispatch system which may be accomplished without the need for disrupting service of the existing free dispatch system and without the need for any modifications to the existing building housing the free dispatch system.

Other objects, advantages and applications of the present invention will become apparent to those skilled in the art of pneumatic tube conveyor dispatchers when the accompanying description of one example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
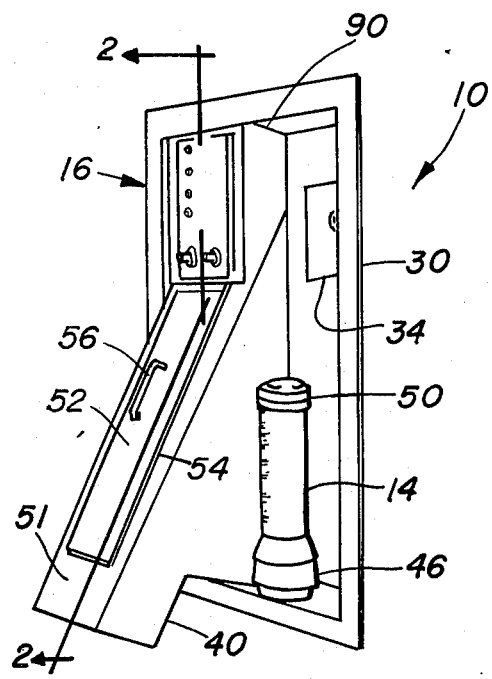
FIG. 1 is a perspective view of a pneumatic tube conveyor dispatcher constructed in accordance with the principles of the present invention.

Referring now to the drawings and, in particular, to FIGS. 1 through 4 wherein there is illustrated one example of the present invention in the form of a pneumatic tube conveyor dispatcher 10 for converting a free dispatch system into a controlled dispatch system. Referring momentarily to FIG. 5, it can be seen that the pneumatic tube conveyor system 11 comprises a plurality of delivery tubes 12 through which carriers 14 (FIG. 1) move from sending terminals 16 to an exchanger or transfer station 18. The exchanger or transfer station 18 is associated with one or more discharge tubes 20 of the system from which the carrier 14 passing therethrough may be directed to a receiving terminal 22. When carriers 14 of the magnetic or ring dial type are utilized, a brush or magnetic selector 24 is adapted to scan the carrier 14 and send a signal to an appropriate deflector mechanism 26 which will direct the carrier 14 to the appropriate receiving terminal 22.

FIG. 1 illustrates the mounting of the inventive dispatcher 10 to the frame 30 of the station terminal 16 which has been modified to receive the dispatcher 10. The station terminal 16 is modified in that it previously consisted of two doors, one of which is not shown. One of the doors was adapted to cover the inlet opening 32 (FIG. 2) through which the carrier 14 was inserted for delivery into a delivery tube 12. Adjacent the opening 32 the second door 34 provides access to the discharge conduit 20 (FIG. 5) and functions as the receiving terminal 22 of the system 11. In the preferred embodiment of the invention the frame 30 of the station terminal 16 is modified by removing the door associated with the inlet opening 32 and by mounting the dispatcher 10 to the frame 30 such that the dispatcher 10 is aligned with the inlet opening 32 in a manner which will be described hereinafter.

Figure 2:
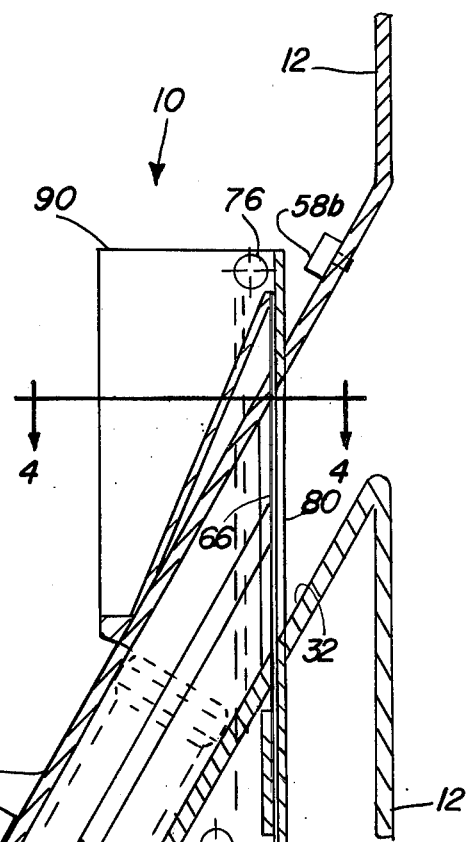
FIG. 2 is an enlarged, fragmentary, cross-sectional view of the pneumatic tube conveyor dispatcher taken along line 2—2 of FIG. 1.

As can best be seen in FIGS. 1 and 2 of the drawings, the dispatcher 10 comprises an angled housing 40 having a carrier chamber 42 which is aligned with the frame inlet opening 32 of the station terminal 16 when the housing 40 is attached to the terminal frame 30 in the aforementioned manner. Actual securement of the housing 40 to the terminal frame 30 may be accomplished by any of a plurality of suitable fastening techniques, such as bolts extending through the frame, adhesives or the like, none of which are shown.

Figure 3:
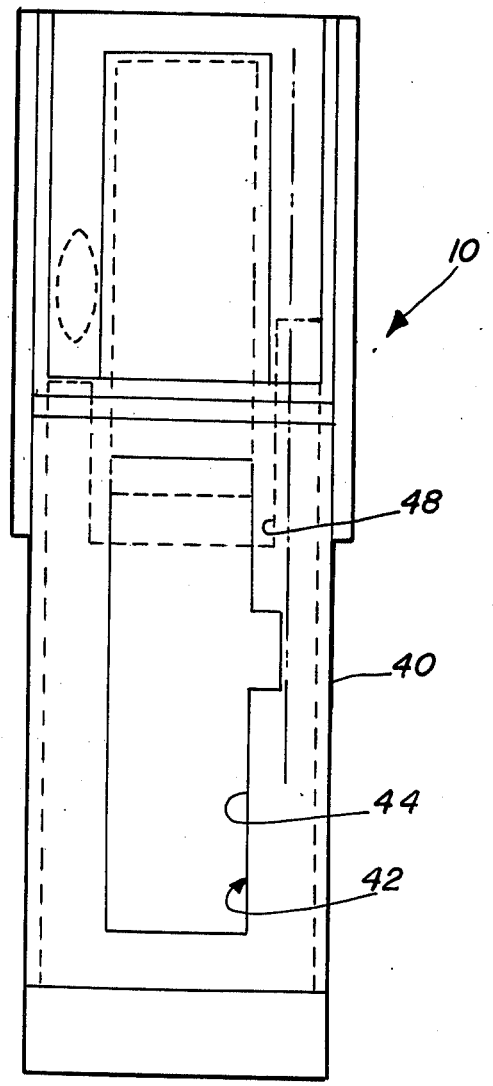
FIG. 3 is a front plan view of the pneumatic tube conveyor dispatcher with portions thereof removed for clarity.

As can best be seen in FIG. 3, the carrier chamber 42 is shaped such that along a substantial portion of its length, its inner diameter, as indicated by the numeral 44, corresponds to the outer diameter of an enlarged lower portion 46 (FIG. 1) of the carrier 14. The upper portion 48 of the carrier chamber 42 has an enlarged diameter which corresponds to the outer diameter of the forward end 50 (FIG. 1) of the carrier 14. It can thus be seen that when the operator desires to position a carrier 14 within the carrier chamber 42, the shape of the chamber 42 is such that the operator must insert the carrier 14 with its forward end 50 facing upward, thereby completely eliminating the aforementioned problems with the prior art apparatuses wherein carriers were inadvertently inserted backwardly into the air tube.

The outer face 51 of the housing 40 mounts an access door 52 (FIG. 1) which has one lengthwise edge 54 hinged to the housing 40 such that the operator may grasp the handle 56 of the door 52 and open the same to obtain access to the carrier chamber 42 so as to position a carrier 14 therein.

It should be noted that the lower rear portion of the carrier chamber 42 slideably supports a captive piston 45, the purpose of which will be explained hereinafter. The carrier chamber 42 also mounts a sensing switch 58 which is actuated when a carrier 14 is positioned on the piston 45 within the carrier chamber 42. The sensing switch 58 may be a button-type switch, as illustrated, or any other suitable switch which is activated in response to the proper positioning of the carrier 14 on the piston 45 within the carrier chamber 42. As will be described hereinafter, the dispatcher 10 is operable only upon receipt of a signal from the sensing switch 58 which indicates that a carrier 14 is in position. A door operated switch 58c indicates that the door 52 is closed.

Figure 4:
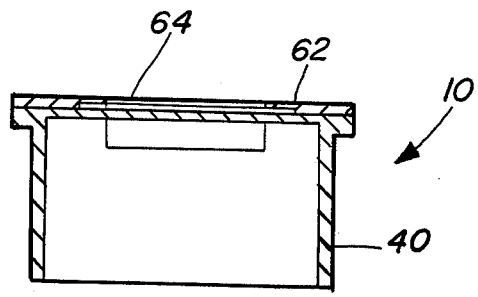
FIG. 4 is a cross-sectional view of the pneumatic tube conveyor dispatcher taken along Line 4—4 of FIG. 2.
Figure 5:
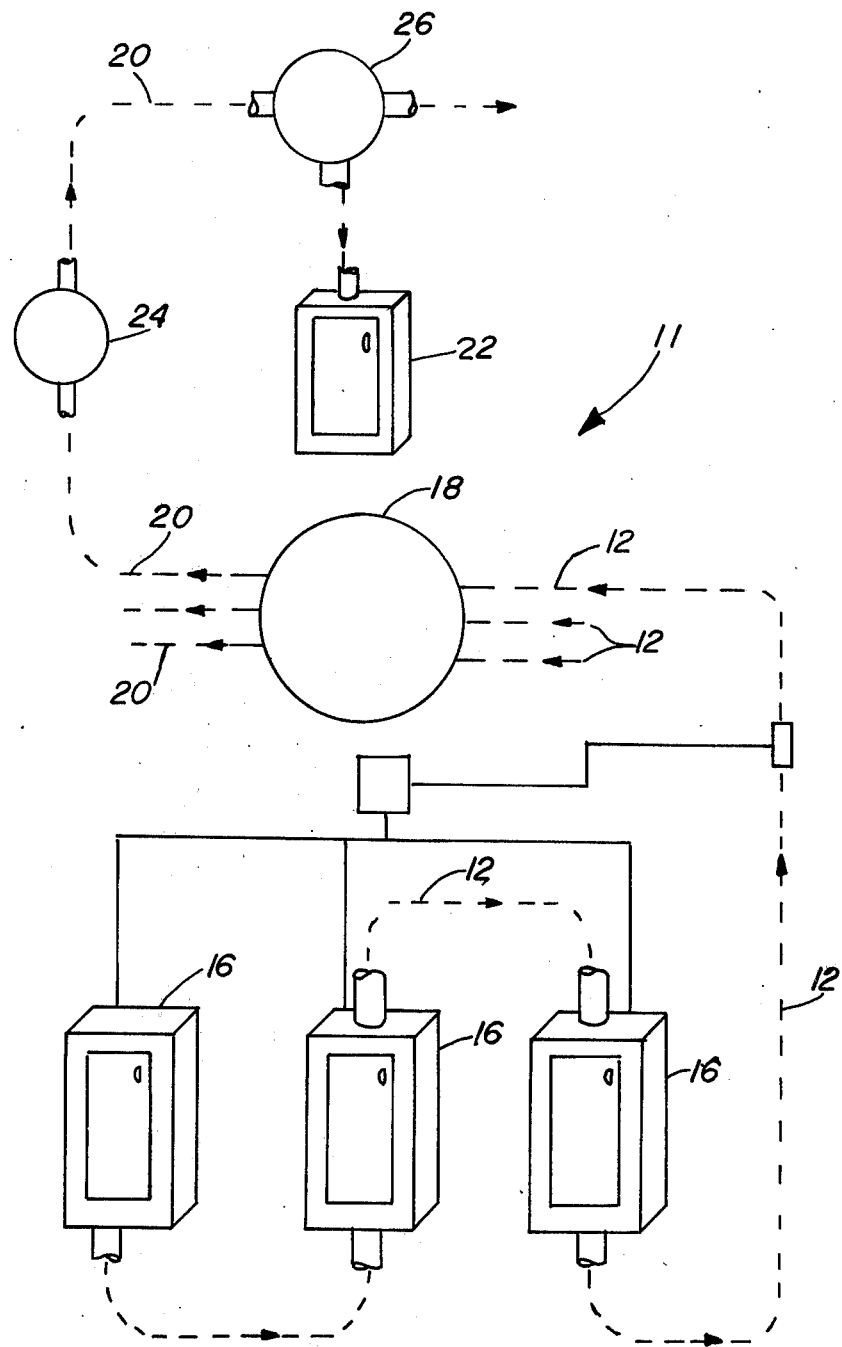
FIG. 5 is a schematic illustration of a free dispatch system which will employ the inventive pneumatic tube conveyor dispatcher illustrated in FIGS. 1 through 4 of the drawings.

As can best be seen in FIGS. 1, 2 and 4, the back side of the housing 40 is enclosed by a cover plate 62 which includes an enlongated slot 64 that provides a guide path for a slider plate 66 (FIG. 2). The lower portion of the housing 40 mounts a suitable electric motor 68 that is coupled by an appropriate gearing mechanism 70 to a drive pulley 72. The drive pulley 72, in turn, drives a drive cable 74 which has one end suitably connected to the lower end of the slider plate 66, while the opposite end of the cable 74 is connected to the upper portion of the slider plate 66. An idler pulley 76 mounted at the upper portions of the housing 40 supports the cable 74, while a second idler pulley 78 provides the appropriate tension to the cable 74. It can be seen that when the electric motor 68 is activated to rotate the drive pulley 72 in a clockwise direction as viewed in FIG. 2 of the drawings, the slider plate 66 under the force of the drive cable 74 will be lowered within the slider plate slot 64 at a sufficient distance so that the carrier chamber 42 is in direct communication with the pneumatic tube 12 via a slot 80 formed in the cover plate 62. It can also be seen that when the electric motor 68 is activated to operate in the opposite direction and the drive pulley 72 is rotated in a counterclockwise direction, the drive cable 74 attached to the upper end of the slider plate 66 will carry the slider plate 66 upwardly in the slider plate slot 64 until it is raised to the position illustrated in FIG. 2 closing communication between the carrier chamber 42 and the pneumatic tube 12. Suitable limit switches (not shown) disposed in the upper and lower ends of the housing 40 are respectively actuated by engagement with the upper and lower portions of the slider plate 66 to indicate its position and to terminate operation of the electric motor 68.

Similarly, a suitable sensing switch 58b located near the upper portion of the housing 40 senses that the carrier 14 has been ejected through the aperture 80 into the pneumatic tube 12 so as to signal the electric motor 68 to actuate and close the opening 80 by positioning the slider plate 66 in its raised position, as shown in FIG. 2. Suitable sensing switches 58c are provided to detect when the door 52 is closed so as to prevent operation of the electric motor 68 and, thus, maintain the slider plate 66 closed when the door 52 is open. Likewise, a suitable locking mechanism 58a may be provided to lock the door 52 when the electric motor 68 is in operation, that is, when the electric motor 68 is either opening or closing the slider plate 66 so as to prevent the insertion of foreign materials into the pneumatic tube 12.

The upper portion of the dispatcher housing 40 mounts an electrical control box 90 which may include the necessary electrical components and elements, such as the type described in the aforementioned patent application, for starting the electric motor 68 to open the slider mechanism 66 in timed relationship to the movement of other carriers 14 that may be in the system 11.

In operation when it is desired to inject a carrier 14 into the system 11, the operator opens the door 52 of the housing 40 and inserts the carrier 14 into the carrier chamber 42 such that the end 50 of the carrier 14 is positioned at the top side of the chamber 42. The operator then closes the door 52 and presses the appropriate start button disposed on the electrical control box 90 on the housing 40. A detector in the pneumatic tube system 11 detects the passages of carriers 14 within the system and supplies this information to a suitable device which controls the number of carriers 14 within the system 11. When the appropriate number of carriers 14 in the system 11 are such as to permit the injection of an additional carrier 14 and the sensing switch 58 has been activated by the positioning of the carrier 14 thereon, the electric motor 68 is activated to drive the pulley 72 in a clockwise direction such that the slider plate 66 is lowered within the slider plate slot 64. The carrier chamber 42 is now in communication with the pneumatic tube 12 via the housing aperture 80. As the vacuum builds up inside the housing chamber 42 in the section thereof ahead of the carrier section 50, atmospheric pressure passing through slot 92 in the bottom of the chamber 42 will exert a force acting against the captive piston 45 so as to drive the piston 45 upwardly within a guide slot 47 so as to inject the carrier 14 into the tube line 12. Suitable limit switches at the upper end of the carrier chamber 42 detect the presence of the captive piston 45 signaling that the carrier 14 has been injected into the aperture 80 whereupon the electric motor 68 is activated in an opposite direction to rotate the pulley 72 in a counterclockwise direction and raise the slider plate 66 to the position illustrated in FIG. 2, whereby the carrier chamber 42 is closed from the pneumatic tube 12. Appropriate limit switches disposed in the housing 40 terminate operation of the motor 68 when the slider plate 66 is in the correct position. The captive piston 45 slides downwardly in the guide slots 47 until the piston 45 reaches its initial starting position at the bottom of the carrier chamber 42. A suitable sensing switch 58 disposed at the bottom of chamber 42 detects the repositioning of the captive piston 45 at the bottom of the carrier chamber 42 and unlocks the door 52 whereupon the user of the system 11 may insert another carrier 14 into the carrier chamber 42.

It can thus be seen that the present invention provides a new and improved dispatcher for pneumatic tube conveyors for simply and economically converting a free dispatch system into a controlled dispatch system.

It should be understood by those skilled in the art of such conveyor systems that other forms of applicant's invention may be had, all coming within the spirit of the invention and scope of the appended claims.

What is claimed is as follows:

1. A pneumatic tube conveyor dispatcher for converting a free dispatch system into a controlled dispatch system and wherein the free dispatch system has an inlet opening through which a carrier may be inserted for passage into the delivery tube of the pneumatic system, said pneumatic tube conveyor dispatcher comprising:
   a housing having a storage chamber for receipt of said carrier, said housing having means mounting said housing to the inlet opening such that said storage chamber is communicable with said inlet opening during a selected mode of operation;
   an entry door carried by said housing to permit access to the chamber to deposit a carrier therein;
   an inlet opening access door disposed at the inlet opening between said storage chamber and the inlet to a pneumatic tube for preventing communication between said storage chamber and said inlet opening;
   means operable for opening said inlet opening access door to permit the passage of said carrier from said storage chamber through said inlet opening into said pneumatic tube;
   a captive piston mounted in a piston chamber at the bottom of said storage chamber said captive piston supporting said carrier thereon; said captive piston being movable in response to a predetermined pressure differential across said piston to move said carrier upwardly to eject said carrier from said storage chamber into said pneumatic tube; and
   the return of said captive piston to its position in the bottom of said storage chamber being by means of gravity.

2. The pneumatic tube conveyor dispatcher defined in claim 1 wherein said inlet opening access door comprises a slider plate mounted on said housing between said storage chamber and said inlet opening, said slider plate being slideably movable from a first position closing communication between said storage chamber and said inlet opening to a second position opening communication between said storage chamber and said inlet opening.

3. The pneumatic tube conveyor dispatcher defined in claim 2 having an electric motor; and means associated with said electric motor for sensing the ejection of said carrier from said storage chamber into said pneumatic tube, said last-mentioned means functioning to reverse the direction of rotation of said motor to return said slider plate from said opened position to said closed position.

4. The pneumatic tube conveyor dispatcher defined in claim 3 comprising means associated with said entry door for locking said entry door when said electric motor is activated, and said locking means maintaining said entry door locked while said slider plate is in said opened position.

5. A pneumatic tube conveyor dispatcher for converting a free dispatch system into a controlled dispatch system and wherein the free dispatch system has an inlet opening through which a carrier may be inserted for passage into the delivery tube of the pneumatic system, said pneumatic tube conveyor dispatcher comprising:

a housing having a storage chamber for receipt of said carrier, said housing having means mounting said housing to the inlet opening such that said storage chamber is communicable with said inlet opening during a selected mode of operation;

an entry door carried by said housing to permit access to the chamber to deposit a carrier therein;

an inlet opening access door disposed at the inlet opening between said storage chamber and the inlet to a pneumatic tube for preventing communication between said storage chamber and said inlet opening;

means operable for opening said inlet opening access door to permit the passage of said carrier from said storage chamber through said inlet opening into said pneumatic tube; said inlet opening access door comprising a slider plate mounted on said housing between said storage chamber and said inlet opening, said slider plate being slideably movable from a first position closing communication between said storage chamber and said inlet opening to a second position opening communication between said storage chamber and said inlet opening;

an electric motor; and means associated with said electric motor for sensing the ejection of said carrier from said storage chamber into said pneumatic tube, said last-mentioned means functioning to reverse the direction of rotation of said motor to return said slider plate from said opened position to said closed position.

* * * * *